Nov. 13, 1951        J. N. NIELSEN        2,575,288
SLIDE RULE
Filed Sept. 23, 1949                             2 SHEETS—SHEET 1
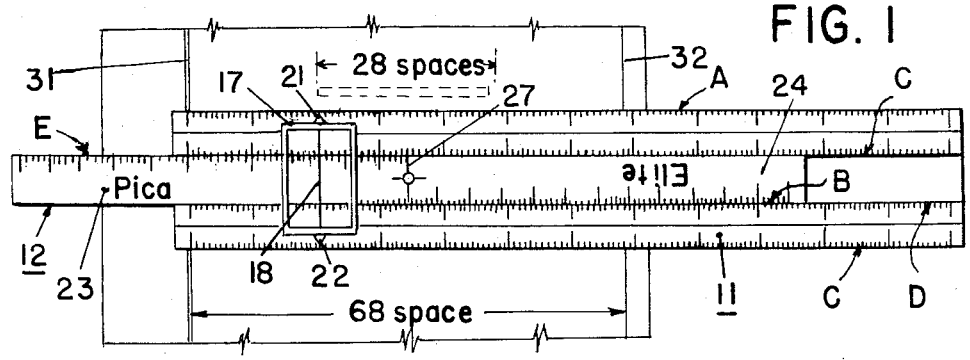
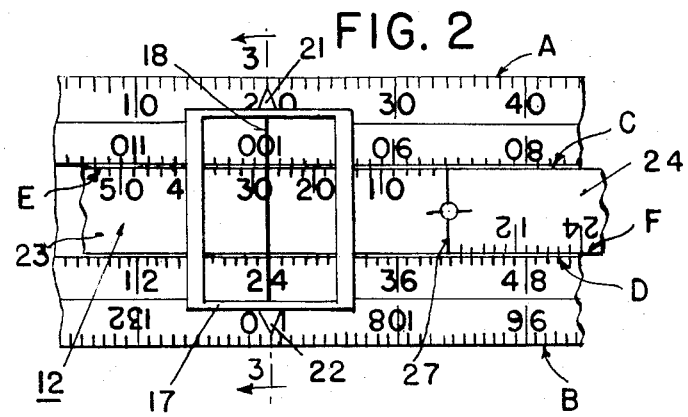
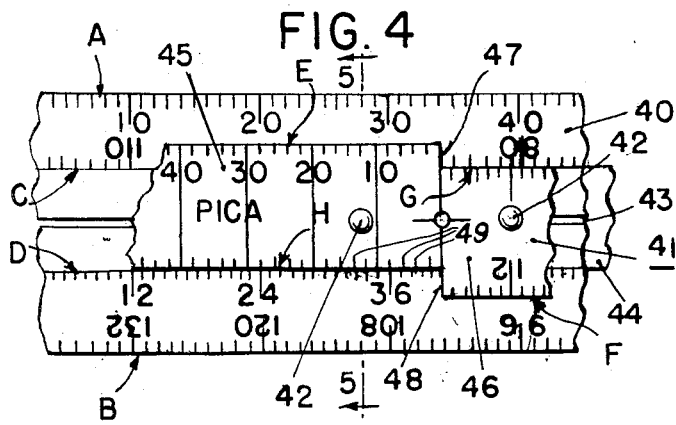
Inventor:
JOSEPH N. NIELSEN,
By *Nielsen & Henne*
Attorneys Nov. 13, 1951 J. N. NIELSEN 2,575,288
SLIDE RULE
Filed Sept. 23, 1949 2 SHEETS—SHEET 2
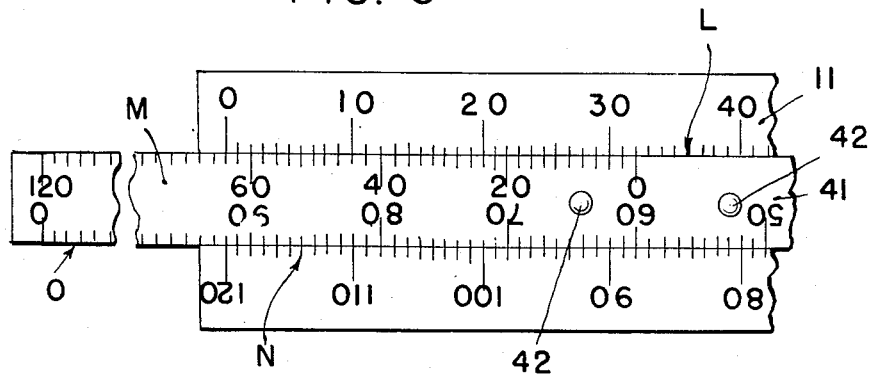
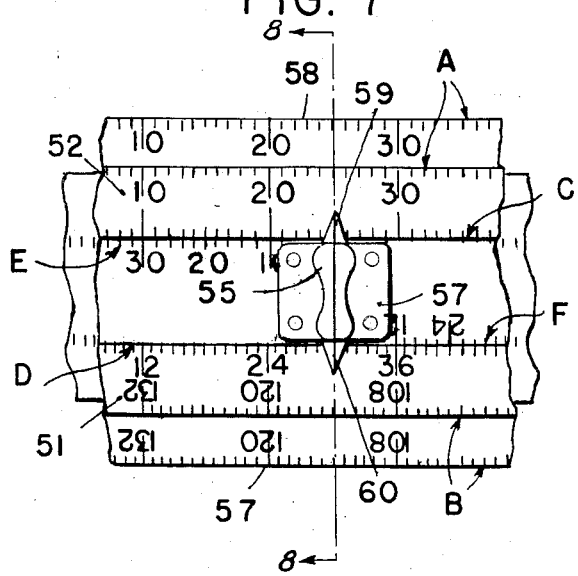
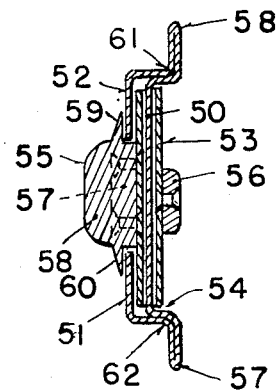
Inventor:
JOSEPH N. NIELSEN,
By Nielsen & Hume
Attorneys Patented Nov. 13, 1951

2,575,288

UNITED STATES PATENT OFFICE 2,575,288

SLIDE RULE

Joseph N. Nielsen, Washington, D. C.

Application September 23, 1949, Serial No. 117,464

7 Claims. (Cl. 235—70)

1

This invention relates to improvements in centering scales for typewritten, printed or other matter. A common requirement in typing is that of centering headings and tabular matter. To do this, it is necessary to find the middle line of the sheet or the space on the sheet in which the typed matter is to be centered and the number of type spaces to be occupied by the heading or tabular matter, and from these is determined or calculated the number on the typewriter scale at which to begin typing; all of this takes time and distracts the typist to lead to inaccuracies. In addition, it frequently happens that it is necessary to transpose from pica type (10 spaces to the inch) to elite type (12 spaces to the inch) in copy work or vice versa and this further adds to the confusion.

It is the primary object of this invention to eliminate the necessity of any calculations by providing an instrument of the slide rule type that gives direct readings upon a simple setting of the device; by this means complicated tables used for the purpose are supplanted. In brief, the invention accomplishes the end sought by providing a rule with a measuring scale on the edge graduated in the desired units (pica or elite), and in conjunction therewith a slide whose effective length is one-half that of the rule scale but in reverse to and graduated in units measuring one-half the length of those of the rule scale. This arrangement and combination of scales divides the sheet space in half, simultaneously divides the heading (or other matter) to be centered in half, and subtracts the latter from the former to give the beginning point for the heading, merely by setting the slide so that the indicia on the slide scale corresponding to the total space width to be centered is under the zero of the rule scale. This in effect reduces the length of the rule to that which equals the particular space width. Also the zero of the slide scale is by this arrangement at the half-way point on the rule scale to thereby give a direct reading of the width center on the rule scale; this obviates the necessity of any separate centering scale having units of twice the length of the rule scale units. Furthermore, the setting of the slide zero mark at the correct centering point on the rule scale makes it possible to read directly on the rule scale indicia at which a heading commences, since the latter then is over the indicia on the slide scale that corresponds to the total length of the heading. In other words, by the centering of the slide and the reverse half scales thereon, direct

2 centering readings are obtained for any width of sheet or space (within the length of the rule) and also the beginning points for not only one heading or table but any number of headings or lines of differing lengths for each setting of the slide that corresponds to a determined sheet or space distance.

The invention further provides for direct readings in both elite and pica types, and, in addition for the transfer of readings from one style to the other; copy that has been typed in one style can thus be recopied in the other style and correctly centered on a sheet or in a space that differs in width from the original copy. Other objects will appear from the following description.

The invention is herein specifically disclosed as applied to typewritten lines. It is, however, of general application in that or the printing art for centering any subject matter in a given space either horizontally or vertically, the scales being in the appropriate measuring units.

In the accompanying drawing, embodiments are disclosed in which—

Fig. 1 is a top view of a conventional sliderule embodiment in assembly with a sheet on which a heading is to be typed;

Fig. 2 is an enlarged view of a portion of Fig. 1;

Fig. 3 is a cross-section on the line 3—3 of Fig. 2;

Fig. 4 is a top view of a simplified embodiment;

Fig. 5 is a cross-section on lines 5—5 of Fig. 4;

Fig. 6 is a view of a portion of the back of Fig. 4;

Fig. 7 is a top view of another embodiment; and

Fig. 8 is a cross-section on the line 8—8 of Fig. 7.

The rule of Figs. 1 to 3 consists of a base member 11 and a sliding bar 12, and these can be of any length to correspond to the widest of typewritten carriage used; for illustration, a rule having a 12 inch length is selected. The rule can take the conventional form, as shown, of wood or other suitable material; or the base and bar or either one can be extruded in continuous strips from a plastic and then cut to the desired length, since they are of uniform cross-section.

The base member 11, Fig. 2, has along one edge a pica type scale A (10 spaces per inch) and along the other edge an elite scale B (12 spaces per inch). Below each scale is a duplicate pica scale C and elite scale D but in inverted relation thereto and numbered in the reverse direction; these scales C and D are not essential but are provided to facilitate the reading of pica measurements on the elite scale and vice versa. The usual indicator or runner 17 with the hair line 18 can also be provided and is slidably mounted in grooves 19, 20; this preferably has, in addition, pointers 21, 22 to cooperate with the scales A and B.

The slide 12 is composed of two half-length sections 23 and 24, one half or section graduated for pica type scale E and the other half for elite type scale F with the scale unit reduced to one-half that of the base scale. These scales E and F are on opposite edges of the slide, and the graduations are in reverse directions from the zero on the center line 27.

In the use of the rule of Fig. 1, the sheet or space in which the matter is to be centered and the heading or line table typed are measured by the pica scale A, if previously typed in that style. Assuming that the space width between margin lines 31, 32 (Fig. 1), measures 68 units, the slide 12 is then set so that "68" on the scale E is under "0" on scale A; the "0" on the slide then shows that the center of the subject matter is at "34" on the scale A. Again assuming that the heading or line to be typed is, as by measurement with scale A, 28 pica units long, then "28" on the scale E shows that the typing of the heading or line begins at "20" (scale A); if it were 50 units long, the line would begin at "9" (scale A), etc. These readings are facilitated by the hairline 18 and pointer 21 of the indicator 17. The center line and the point of beginning of the heading indicated by the rule can be marked on the paper or read on the typewriter scale.

The elite scale is used in the same manner. If the matter is in pica but it is to be copied in elite, the elite scale D shows that for a space 68 pica spaces in width, the 28 pica (34 elite) space heading begins at 24 of the elite scale D as shown by the hairline 18, the 50 pica heading at 11, etc.

The simplified embodiment of Figs. 4 and 5, comprises thin strips preferably of plastic, Bristol board, metal or the like; a base member 40 carries a slide 41 that is shown secured to the base by means of rivets 42 or the like engaging a slot 43 in the base. The rivets 42 preferably extend through a sliding backing strip 44 to give purchase to the rivets and support the base member; the strip 44 can be of any convenient length, and it can be a slide marked with scale indicia to cooperate with scale indicia on the back of the base member. The slide preferably has two arms 45 and 46 with offsets 47 and 48 at the zero line of the pica scale E and elite scale F; the arm 45 covers the reverse pica scale C on the base 40 and the arm 46 covers the reverse elite scale D; this is for the purpose of bringing the scale E (or F) in juxtaposition to the scale A (or B) to aid the direct reading and to avoid confusion with inverted scale C (or D). To facilitate transferring pica to the elite or vice versa, scale marks G, H, as repetitions of scales E, F, are provided on the opposite edges of the slide sections and with cross lines 49 extending across each section. With this offset construction and markings, the slide also functions as the indicator.

In the use of the simplified form, it is only necessary to set the slide under the zero of the rule or base scale and make the direct readings on the base scale as before. While the rivets limit the movement of the slide, they are so placed as to permit substantially all readings that may arise.

The other sides of the base and the slide of the rule of Fig. 4, shown in Fig. 6, are marked for vertical centering of subject matter by the provisions of a scale L on the base member 11 divided in suitable units for the purpose, and a subtracting or reverse half scale M on the slide 44. The operation is like that of the obverse; the indicia on scale M corresponding to the length of the sheet or space in which the matter is to be centered vertically, is placed under the zero of the scale L and the zero of the slide scale M then locates the center horizontal line of the sheet or space; over the indicia on the slide scale M corresponding to the number of lines to be typed can then be read the number of lines from the top of the sheet or space at which the first line is typed. The opposite edge of the reverse slide of the base 11 and slide 44 can also be marked in any suitable units, such as, for example, for addition and subtraction shown by scales N, O; the scales divisions are preferably in tenths of an inch to facilitate these operations of adding and subtracting.

Other embodiments are possible. The base of the rule of Fig. 1, can, for example, take the form of spaced parallel bars with inner grooves to receive the slide bar, and, connected at the ends by metal or equivalent cross pieces; this construction permits marking of the under side with scales, such as shown in Fig. 6. Again, while in the embodiment of Fig. 4, the placement of the rivets limits the longitudinal movement of the slide, they can be spaced vertically at the middle to travel in two parallel slots in the base and thus lengthen the movement. The rivets can be obviated, moreover, by inturned edges on the base engaging the slide 41, with separate inturned edges on the under side attached to the base to receive the slide 44 if so desired; here again extrusion-molding of the base in one integral part is possible because of the uniform cross section, and the slide bars can be cut from the sheet stock.

Another embodiment is illustrated in Figs. 7 and 8, wherein a slide takes the form of an endless belt made from an elastomer like rubber, a flexible plastic, woven fabric or ribbon, etc. A base member 50 of sheet metal or other deformable material is illustrated; but it can be molded into shape from a plastic as, for example, by extrusion in continuous long strips that are cut into the desired lengths. As shown, the base has inturned flanges 51, 52, serving as guides or confining means for the endless belt 53 on the top side, and a depression 54 on the under side for the same purpose. The belt carries the scales E, F, and can be provided with a tab 55 located at the "0" center line of the belt for sliding it back and forth, and a duplicate tab 56 can be attached on the under side; as illustrated, the tab 55 preferably takes the form of a runner block 57, to the underside of which is secured the belt 53, with an upstanding finger-grip 58 and pointers 59, 60 to indicate the centering indicia on the scales A and B. Preferably one or both side edges 61, 62 are offset as at 63, 64 to provide for the measuring scales A and B on the edges. The top side of the rule and slide is marked with scales of the character shown in Fig. 1, the scales A and B being on the edges 57, 58, and repeated on the flanges 51 and 52 if desired; and the underside of the rule can be provided with scales as shown in Fig. 6.

What is claimed is:

1. Rule comprising in combination a base bearing a scale of a length and with graduations in units providing a measure of a space distance; and a slide movable along the base and bearing a scale for cooperation with the base scale, said slide scale being in the reverse direction to the base scale and graduated in a unit measure of one-half that of the base scale, the effective length of the slide scale being one-half that of the base scale to bring the zero of the slide scale under a midpoint on the base scale corresponding to the setting of the slide scale under the zero of the base scale.

2. Rule comprising in combination a base bearing along one edge a scale of a length and with graduations in units providing a measure of a space distance, and along an opposite edge a second scale of a length and with graduations in units differing from the first scale as a measure of the space distance; and a slide movable along the base having two sections extending from a middle line, each section bearing a scale with graduations from a zero middle line in units of one-half the units of each of the base scales for cooperation with the latter to transfer readings from one unit scale to the other unit scale.

3. Rule comprising in combination a base bearing along an edge of a length and with graduations in units providing a measure of a space distance, and along the opposite edge a second scale of a length and with reverse order graduations in units differing from the first scale as a measure of the space distance; inverted scales of the same unit measure paralleling each of the edge scales; and a slide movable along the base having two sections extending from a middle line, each section bearing a scale with graduations from the middle line as zero in units of one-half of each of the base scales for cooperation with the latter and with the inverted base scales for transfer of readings from one set of units into the other.

4. Rule comprising in combination a base bearing along an edge a scale of a length and with graduations in units providing a measure of a space distance, and along the opposite edge a second scale of a length and with reverse order graduations in units differing from the first scale as a measure of the space distance; inverted scales of the same unit measure paralleling each of the edge scales; and a slide movable along the base having two sections offset from each other at the middle line to cover the inverted base scales adjacent thereto, each section bearing on the offset edge a scale with graduations from the middle line as zero in units of one-half of each of the base scales for cooperation with the latter and with the uncovered portions of the inverted scales for transfer of readings from one set of units to the other.

5. Rule comprising in combination a base bearing a scale along one edge graduated in one set of units, and a second scale along the opposite edge graduating in another set of units; and a slide movable along the base bearing on one side of the middle line a scale graduated from the middle line as zero in one-half units of the first base scale for cooperation therewith and another scale on the other side of the middle line graduated from the middle line as zero in one-half units of the second base scale for cooperation therewith to enable readings in one set of units to be translated into the other set of units.

6. Rule comprising in combination a base bearing a unit scale; and a slide movable along the base and bearing a half-unit scale cooperating with and in reverse order to the base scale, said slide scale having its zero graduation at the middle of the slide to bring the said zero graduation under the graduation on the base scale denoting the center of that length of space for which the slide scale is set by positioning under the zero of the base scale.

7. Rule comprising in combination a base bearing a scale, said base having inturned edge flanges on one side and a middle longitudinal depression on the other side; an endless belt having a cooperating scale movable between the flanges and in the depression; a finger-grip secured to the belt and guided by said inturned flanges for operating the belt; and an indicating pointer extending from the grip for cooperation with the base scale.

JOSEPH N. NIELSEN.

REFERENCES CITED

The following references are of record in the file of this patent:

UNITED STATES PATENTS

| Number | Name | Date |
|---|---|---|
| 1,215,441 | Walker | Feb. 13, 1917 |
| 1,528,992 | Rose | Mar. 10, 1925 |
| 2,093,636 | Fornaroli | Sept. 21, 1937 |
| 2,359,837 | Freedlander | Oct. 10, 1944 |

FOREIGN PATENTS

| Number | Country | Date |
|---|---|---|
| 147,690 | Germany | Jan. 28, 1904 |
| 515,071 | Germany | Dec. 30, 1930 |